Figure 1:
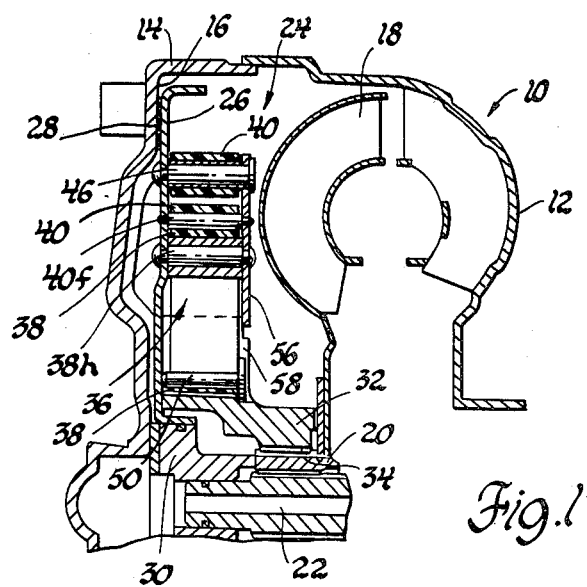

United States Patent [19]

Mathues

[11] 4,300,670
[45] Nov. 17, 1981

[54] VIBRATION DAMPER FOR A FRICTION CLUTCH

[75] Inventor: Thomas P. Mathues, Miamisburg, Ohio

[73] Assignee: General Motors Corporation, Detroit, Mich.

[21] Appl. No.: 129,123

[22] Filed: Mar. 10, 1980

Related U.S. Application Data

[63] Continuation-in-part of Ser. No. 56,775, Jul. 11, 1979, abandoned.

[51] Int. Cl.³ ............................................. F16D 3/68
[52] U.S. Cl. .............................. 192/106.1; 64/27 NM
[58] Field of Search ................. 192/106.1, 106.2, 3.21, 192/3.28, 3.29, 3.31, 70.17, 55; 64/27 NM, 27 C, 27 S, 27 R; 185/37

[56] References Cited

U.S. PATENT DOCUMENTS

| | | | |
|---|---|---|---|
| 1,642,475 | 9/1927 | Wood | 192/106.1 |
| 1,654,312 | 12/1927 | Trumpler | |
| 1,975,772 | 10/1934 | Davis | 192/106.1 |
| 3,280,949 | 10/1966 | Ross | 192/106.1 |
| 3,656,586 | 4/1972 | Robson | 185/37 |
| 4,034,575 | 7/1977 | Barth | 64/27 NM |
| 4,252,227 | 2/1981 | Staub | 192/55 X |

FOREIGN PATENT DOCUMENTS 709115  5/1954  United Kingdom ............ 192/106.1

Primary Examiner—George H. Krizmanich
Attorney, Agent, or Firm—Donald F. Scherer

[57] ABSTRACT

A vibration damper is disposed between the input and output members of a friction clutch to reduce the transmission of torsional vibrations. The damper has a plurality of elastomeric bands each having one end connected to the clutch input and the other end connected to the clutch output. The bands are guided between the ends by a plurality of spaced guide members. As torque is transmitted between the clutch input and output, the bands will elongate and contract to permit relative movement between the clutch input and output thereby reducing the transmission of torsional vibration.

6 Claims, 2 Drawing Figures

VIBRATION DAMPER FOR A FRICTION CLUTCH

This is a Continuation-In-Part of application Ser. No. 056,775, filed July 11, 1979, now abandoned.

This invention relates to clutch vibration dampers and more particularly to clutch vibration dampers having elastomeric members with transmit torque between the input and output members of the clutch.

It is an object of this invention to provide an improved clutch vibration damper having a plurality of elastomeric members interconnecting the input and output members of the clutch.

It is another object of this invention to provide an improved clutch vibration damper wherein a plurality of elastomeric members each have one end secured to the clutch input and another end secured to the clutch output.

It is yet another object of this invention to provide an improved clutch vibration damper wherein a plurality of elastomeric members each have one end secured to the clutch input and another end secured to the clutch output and wherein each elastomeric member is guided by a plurality of guide members intermediate the clutch input and clutch output.

It is still another object of this invention to provide an improved clutch vibration damper wherein a plurality of elastomeric members each have one end secured to the clutch input and another end secured to the clutch output and wherein the clutch output has an outer surface which contacts each band for an increasing length as relative angular displacement between the clutch input and clutch output increases.

It is a further object of this invention to provide an improved clutch vibration damper wherein a plurality of elastomeric members each have one end secured to the clutch input and another end secured to the clutch output and wherein a plurality of guide members for each elastomeric member are spaced angularly and radially inward to contact the elastomeric member as it extends between the clutch input and clutch output members.

Figure 2:
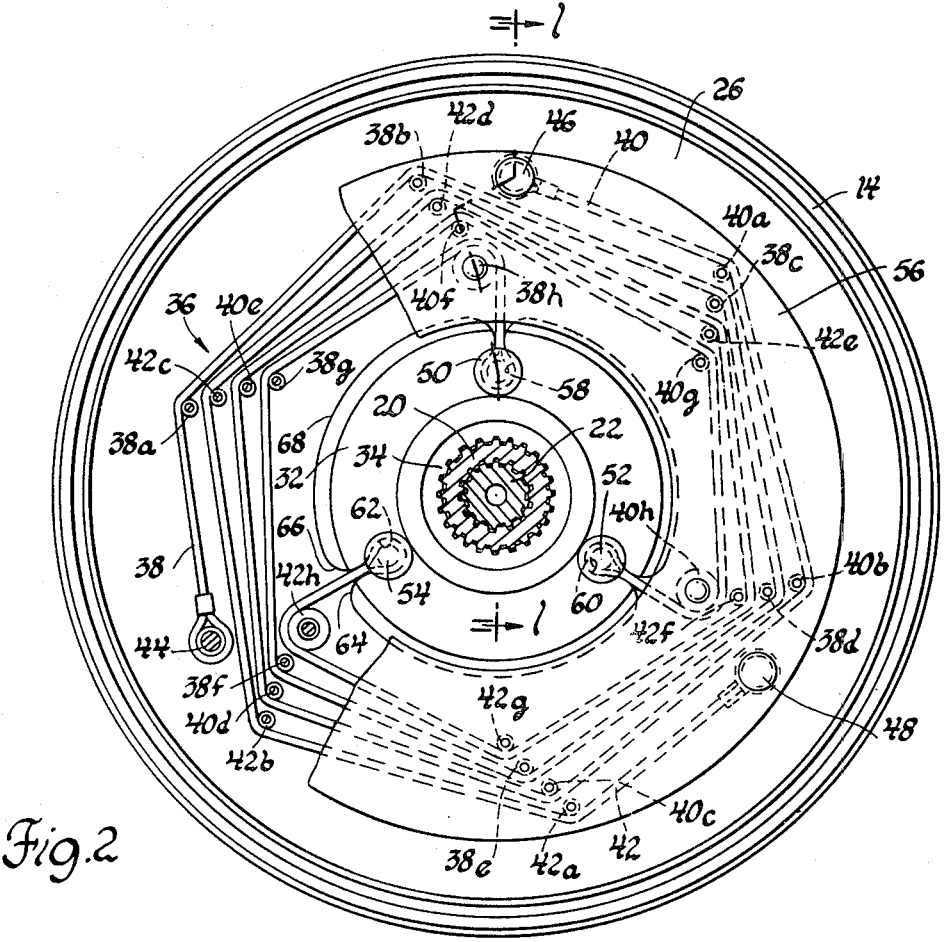

These and other object and advantages of the present invention will be more apparent from the following description and drawings in which:

FIG. 1 is a cross-sectional elevational view of a converter clutch and damper assembly incorporated in a fluid torque converter; and FIG. 2 is an end view of the elastomeric band members found in the vibration damper.

Referring to FIG. 1, there is seen a conventional torque converter or fluid coupling generally designated 10, having an impeller 12 adapted to be driven through an input shell 14 by an internal combustion engine, not shown. The input shell 14 has a smooth angular surface 16 disposed near the outer periphery thereof. This surface 16 provides a friction engaging surface on the input shell 14. The torque converter 10 also includes a turbine member 18 which is drivingly connected through hub 20 to a torque converter output shaft 22 which in turn may be connected to a conventional planetary gear type transmission.

A friction clutch generally designated 24 is disposed in the space intermediate the turbine 18 and the input shell 14. The clutch 24 includes a clutch pressure plate or input member 26 which has a friction surface 28 bonded thereto and adapted to frictionally engage the annular surface 16. The pressure plate 26 is slidably disposed on a thrust washer support member 30 which is disposed intermediate the turbine hub 20 and the input shell 14. The clutch 24 also includes an output hub 32 which is drivingly connected through a spline 34 to the turbine hub 20 and therefore to the shaft 22. The clutch 24 is adapted to be engaged with the input shell 14 through the application of fluid pressure to the right side of the pressure plate 26 and disengaged therefrom through the application of fluid pressure to the left side of pressure plate 26. The pressure reversal on pressure plate 26 may be provided in accordance with the teaching of U.S. Pat. No. 3,252,352 issued to General et al or U.S. Pat. No. 3,693,478 issued to Malloy.

A vibration damper generally designated 36 is disposed between the pressure plate 26, which provides a clutch input member, and the output hub 32. In the preferred embodiment, the vibration damper 36 includes three elastomeric bands 38, 40 and 42 which extend from anchor pins 44, 46, and 48, respectively, to anchor pins 50, 52 and 54, respectively. The pins 44, 46 and 48 are secured to the pressure plate 26 and an annular disc 56. The anchor pins 50, 52 and 54 are disposed in slots 58, 60 and 62, respectively, which are formed in the output hub 32. Each of the slots 58, 60 and 62 has contiguous therewith a pair of curved guide surfaces 64 and 66 which blend with the outer cylindrical surface 68 of the hub 32. The elastomeric band 38 is guided by eight guide rollers designated 38a, 38b, 38c, 38d, 38e, 38f, 38g, 38h, as it extends from pin 44 to pin 50.

As can be seen in FIG. 2, the guide rollers 38a and 38b are spaced circumferentially from pin 44 while guide members 38c through 38h are displaced both circumferentially and radially from each other. The guide member 38h is a larger diameter than the other guide members to accommodate the larger angular bend of elastomeric member 38 which takes place at this guide member. All of the guide members are disposed between the pressure plate 26 and the disc 56 in such a manner as to permit rotation thereof as the elastomeric members elongate and contract. The other elastomeric bands 40 and 42 are guided in a manner identical to elastomeric band 38 and the guide members thereof have been given numerical designations consistent with the designations given to the guide members of band member 38 such that a further description of the individual guides is not necessary.

Preferably, the bands are prestressed at initial assembly which ensures they will actively accept torque transmission at low levels. A prestress which premits five percent (5%) elongation has been found to be acceptable. With this prestress level, the "at rest" tension in each band is approximately 1200 psi. The elastomeric bands 38, 40 and 42 are preferably made from an elastomeric oriented co-polymer which exhibits properties that are useful in vibration damping. Examples of such materials are found in U.S. Pat. No. 3,766,146 to Witsiepe, issued Oct. 16, 1973; U.S. Pat. No. 4,076,226 to Anolick et al., issued Feb. 28, 1978; and U.S. Pat. No. 4,128,698 to Anolick, issued Dec. 5, 1978, all assigned to Du Pont Company. A particularly suitable material is sold by Du Pont Company under the tradename Hytrel which has been prestressed to orient the molecules of the material along the longitudinal axis of the band. The bands 38, 40 and 42 can be formed of a single belt or a plurality of concentric belts. The use of a plurality of belts is preferable. If the bands 38, 40 and 42 are formed from six concentric layers of material having a length of 0.009 inches of thickness, 1.0 inch of width, and an assembled length of 30 inches, a 120° damper with a torque capacity of 240 foot pounds is possible. A sample of the material having a gauge thickness of 0.009 inch will exhibit the following physical properties:

| Tensile Strength | 21,500 psi |
| --- | --- |
| Ultimate Elongation | 95% |
| Tear Strength | 65 lbs/in. |

When the friction surface 28 engages the surface 16, there is a direct drive relation between the engine, not shown, and the shaft 22 through the clutch 24 and bypassing the torque converter 10. Without the damper 36, all of the engine torsional vibrations would be transmitted directly to shaft 22 and would be quite apparent to a person operating a motor vehicle having such a drive system. However, when utilizing the present system, the input torque at friction surface 28 is transmitted to the elastomeric bands 38, 40 and 42 through their respective input anchor pins. The torque is then transmitted through the bands to the respective output anchor. The elastomeric bands 38, 40 and 42 will permit relative angular displacement between the clutch input and clutch output such that the engine torsional vibrations are absorbed within the elastomeric band members thereby reducing the amount of torsional disturbance which will be transmitted to shaft 22 and thereby imposed on the vehicle drive line.

As relative rotation between the input member 26 and output hub 32 occurs, the elastomeric band members will contact either surface 64 or 66 depending upon the direction of relative angular movement. As greater relative angular displacement occurs, the band will also contact the output surface 68 and will extend tangentially from the outer surface 68 to its respective anchor pin such as 38h. It should also be appreciated that the total degress of relative angular displacement is desirably limited to the space between the anghor pins 50, 52 and 54 connected to the output hub 32. Thus, for three elastomeric bands as shown, the angular limit is desirably 120°.

The output surface 68 of hub 32 determines the reactive torque available for a given amount of band stress. If the outer diameter of hub 32 is circular as shown, the torque function will be linear in relation to band stress. However, if desirable, the shape of outer surface 68 can be varied to provide a torque-stress relationship if such a change is found to be desirable in a particular application. For instance, changing the outer surface 68 will permit the use of various torque and travel relationships for different vehicles using similar size torque converters wherein it will be necessary to provide only a different output hub for each particular torque and travel range desired. It should also be apparent from the foregoing description that various numbers of elastomeric bands can be used depending upon the torque levels desired. However, the practical minimum number is two, since the use of one band connected at the input and output members would result in unbalanced forces in the system.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A vibration damper for a torque converter clutch having an input pressure plate member and an output hub, said damper comprising; a disc member axially spaced from said input pressure plate member; a plurality of equally spaced input anchor means secured between said input pressure plate member and said disc member adjacent the outer periphery of said disc member; a plurality of equally spaced output anchor means secured to said output hub; a plurality of elastomeric band members each having one end connected to respective input anchor means and another end connected to respective output anchor means; and guide means for each of said elastomeric band members disposed between said input pressure plate member and said disc member for guiding said elastomeric band members between said input anchor means and said output anchor means.

2. A vibration damper for a torque converter clutch having an input pressure plate member and an output hub, said damper comprising; a disc member axially spaced from said input pressure plate member; a plurality of circumferentially spaced input anchor means secured between said input pressure plate member and said disc member adjacent the outer periphery of said disc member; a plurality of circumferentially spaced output anchor means secured to said output hub; a plurality of circumferentially extending elastomeric band members equal to the number of input anchors and each having one end connected to respective input anchor means and another end connected to respective output anchor means; and guide means for each of said elastomeric band members disposed between said input pressure plate member and said disc member for guiding said elastomeric band members between said input anchor means and said output anchor means.

3. A vibration damper for a torque converter clutch having an input pressure plate member and an output hub, said damper comprising; a disc member axially spaced from said input pressure plate member; a plurality of circumferentially spaced input anchor means secured between said input pressure plate member and said disc member adjacent the outer periphery of said disc member; a plurality of circumferentially spaced output anchor means secured to said output hub; a plurality of circumferentially extending elastomeric band members equal to the number of input anchors and each having one end connected to respective input anchor means and another end connected to respective output anchor means; and eight guide means for each of said elastomeric band members disposed between said input pressure plate member and said disc member for guiding said elastomeric band members between said input anchor means and said output anchor means with two guide means for each band circumferentially spaced from the input anchor and the remaining six guide means spaced both circumferentially and radially.

4. A vibration damper for a torque converter clutch having an input pressure plate member and an output hub, said damper comprising; a disc member axially spaced from said input pressure plate member; a plurality of equally circumferentially spaced input anchor means secured between said input pressure plate member and said disc member adjacent the outer periphery of said disc member; a plurality of equally circumferentially spaced output anchor means secured to said output hub; a plurality of circumferentially extending elastomeric band members each having one end connected to respective input anchor means and another end connected to respective output anchor means; guide means for each of said elastomeric band members disposed between said input pressure plate member and said disc member for guiding said elastomeric band members between said input anchor means and said output anchor means; and an outer surface on said output hub extending from said output anchor means and being shaped to establish the torque available at said output hub and contacting increasing lengths of said elastomeric band members as torque transmission increases.

5. A vibration damper for a torque converter clutch having an input pressure plate member and an output hub, said damper comprising; a disc member axially spaced from said input pressure plate member; a plurality of equally circumferentially spaced input anchor means secured between said input pressure plate member and said disc member adjacent the outer periphery of said disc member; a plurality of equally circumferentially spaced output anchor means secured to said output hub; a plurality of circumferentially extending elastomeric band members each having one end connected to respective input anchor means and another end connected to respective output anchor means; eight guide means for each of said elastomeric band members disposed between said input pressure plate member and said disc member for guiding said elastomeric band members between said input anchor means and said output anchor means, with two guide means for each band circumferentially spaced from the input anchor and the remaining six guide means spaced both circumferentially and radially; and an outer surface on said output hub extending from said output anchor means and being shaped to establish the torque available at said output hub and contacting increasing lengths of said elastomeric band members as torque transmission increases.

6. A vibration damper for a torque converter clutch having an input pressure plate member and an output hub, said damper comprising; a disc member axially spaced from said input pressure plate member; a plurality of substantially equally angularly spaced input anchor means secured between said input pressure plate member and said disc member adjacent the outer periphery of said disc member; a plurality of substantially equally angularly spaced output anchor means secured to said output hub; a plurality of elastomeric band members of material permitting substantial elongation and return, each band member having one end connected to respective input anchor means and another end connected to respective output anchor means; and guide means for each of said elastomeric band member disposed between said input pressure plate member and said disc member and defining substantially regular polygons for guiding said elastomeric band members in at least approximately polygonal paths of substantial length between said input anchor means and said output anchor means, whereby the lengthy strands of elastomeric material resiliently couple said pressure plate member and said disc member and define substantial volume of elastomeric material subjected to elongation and return to permit angular excursion between the input pressure plate and the output hub and to provide vibration damping.

* * * * *